March 24, 1970     I. P. KAMINOW     3,502,391

OPTICAL BEAM DEFLECTOR USING DIVERGING OR CONVERGING BEAMS

Filed Dec. 5, 1966     2 Sheets-Sheet 1

INVENTOR
*I. P. KAMINOW*
BY
ATTORNEY

United States Patent Office

3,502,391
Patented Mar. 24, 1970

3,502,391
OPTICAL BEAM DEFLECTOR USING DIVERGING OR CONVERGING BEAMS
Ivan P. Kaminow, New Shrewsbury, N.J., assignor to Bell Telephone Laboratories, Incorporated, Murray Hill, N.J., a corporation of New York
Filed Dec. 5, 1966, Ser. No. 599,255
Int. Cl. G02f 1/28
U.S. Cl. 350—161                    8 Claims

ABSTRACT OF THE DISCLOSURE

An acoustic diffraction grating light deflector in which a focused optical beam and a plane acoustical beam interact in a suitable element which is positioned in an optical cavity resonant at the optical frequency.

BACKGROUND OF THE INVENTION

Field of the invention

This invention relates to optical beam systems and, more particularly, to systems involving the deflection of an optical beam for use in memory, logic, switching, and light modulation arrangements.

Description of the prior art

In the copending patent application of E. I. Gordon Ser. No. 377,353, filed June 23, 1964, and Ser. No. 530,893, filed Mar. 1, 1966, both assigned to the assignee hereof, there are disclosed electro-optic or photo-elastic diffraction-grating deflectors in which microwave-excited wave-like variations in the index of refraction deflect a beam of light that is appreciably broader than the spatial period of the variation, the range and speed of deflection being appropriate for the foregoing uses. Such high-frequency variations in the index of refraction will be called acoustic waves in this specification. In the case of the photo-elastic effect, the variation in index of refraction arises from a hypersonic strain or elastic wave which is in fact an acoustic wave. In the case of the electro-optic effect, the variation in index of refraction arises from an electromagnetic wave, which has a phase velocity much larger than that of the elastic wave.

The range of deflection in any given coordinate is related to the total frequency range over which the electrical input can be varied and still provide acoustic waves that achieve significant light scattering. The speed of deflection is the inverse of the time required for a change in deflection, which is the same as the time required for a change in the effective frequency of the acoustic wave. The latter time period is approximated by the transit time of an acoustic wave across the light beam.

The transit time is usually limited by practical considerations; that is, a very short access time is desired in most of the foregoing systems. Therefore, efforts to increase the total capacity of such systems have been directed to increasing the effective frequency range of the acoustic waves. It is known that decreasing the width of the transducer that converts the input electrical signal into acoustical waves will increase the frequency range over which the acoustic waves can achieve significant scattering of the light, with the scattering efficiency being fairly uniform over that range; but increased input power is required to achieve significant amounts of light deflection even though a narrow transducer is generally capable of handling less power than one of large width. In compromising the various design considerations to achieve systems of large capacity, a limit is reached beyond which transducers are overtaxed with respect to their power handling capabilities.

In accordance with the disclosure of application Ser. No. 530,893, this limitation was overcome by focusing the acoustic energy to form an acoustic wavefront that was circularly curved in at least one dimension. In any arrangement employing this principle, the focusing means and an effective width greater than the width of the waist that characterized the beam according to diffraction theory, and therefore relatively large transducers were effective to provide much larger effective frequency ranges than priorly.

SUMMARY

In accordance with the present invention, the frequency limitation of the prior art is overcome by focusing the optical energy to provide an optical wavefront that is circularly curved in at least one dimension. The incident acoustic energy is an unfocused traveling wave, and the interaction advantageously takes place in the optical cavity within which the optical beam is generated. The entire acoustical beam width is therefore useful in the deflection process.

In one specific embodiment of the invention, a diverging lens is placed within a laser cavity between the active laser medium and an element of acousto-optic material disposed within the cavity on the cavity axis.

A more complete understanding of the present invention can be obtained from consideration of the following detailed description, taken in conjunction with the accompanying drawing.

DESCRIPTION OF THE PREFERRED EMBODIMENTS

It is now well known that acoustic scattering of light in a medium is associated with the change in index of refraction accompanying an acoustic wave propagating therethrough. One theoretical explanation for this change is that the index perturbation arises from the changes associated with compression of the atomic lattice of the scattering medium. The scattering is therefore essentially a lossless process, and simple wave energy-momentum conservation principles apply.

Figure 1:
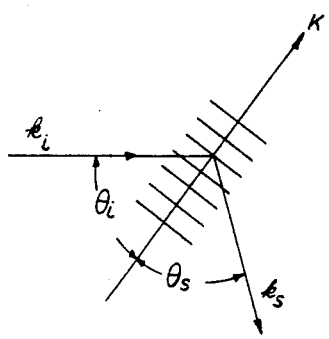
FIG. 1 is a representational view of an optical-acoustical interaction.

FIG. 1 illustrates the interaction of plane monochromatic optical and acoustical waves. The incident light can be described by light wave vector $k_1=\omega/c'$ where $\omega$ is the optical angular frequency and $c'$ is the light velocity in the scattering medium. When an incident light ray meets the varying index of refraction caused by a propagating acoustical wave $K=\Omega/v$ where $v$ is the acoustic velocity in the scattering medium and $\Omega$ is the acoustical angular frequency, a diffraction grating effect is produced and a light ray $k_s$ is diffracted at an angle $\theta_s$. This angle is equal to the angle of incidence, $\theta_i$, of $k_1$ on the grating. The maximum scattering effect is produced when $\theta$ is equal to the Bragg angle $\theta_B$, which satisfies the relationship $$\sin\theta_B=\frac{1}{2}\frac{|K|}{|k_i|}$$

The scattering process is described by energy-momentum vector considerations as $$\vec{k}_s = \vec{k}_i \pm \vec{K}$$
$$\omega_s = \omega \pm \Omega$$

Figure 2:
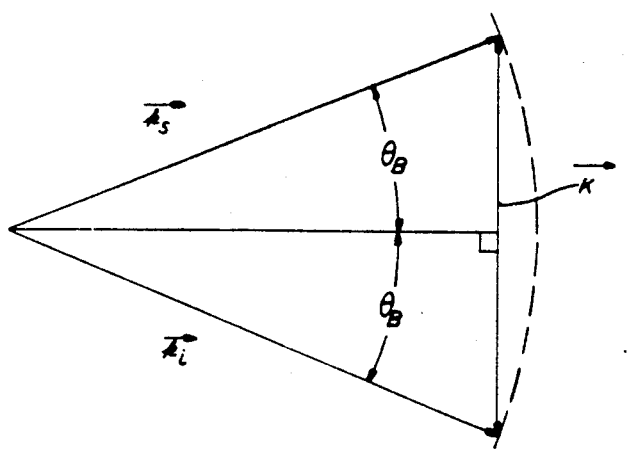
FIG. 2 is a graphical display of optical-acoustical scattering for plane, monochromatic optical and acoustical waves.

Since the acoustical and optical frequencies are so widely different, the magnitude of $k_s$, which is described by $$k_i\left(1 \pm \frac{\Omega}{\omega}\right)$$

is only trivially different from the magnitude of $k_i$. The locus of scattering interaction in the momentum plane is therefore a circle of radius $|k|$ as shown in FIG. 2. Significant cumulation of scattered ray output occurs when the vector triangle $$\vec{k}_i + \vec{k}_s = \vec{K}$$

is closed for a ray incident upon successive lines of the acoustical grating. The output is therefore a beam which can be focused to a spot.

In order to produce line scanning of the output, it is necessary to vary one of the vector parameters. The condition that the vector triangle be closed must, however, continue to be met in order for there to be an actual scattered output. Embodiments of the present invention use a distribution in the direction of the incident optical ray $k_i$ to obtain line scanning. In particular, focusing is introduced into the incident optical energy beam, thereby producing a simultaneous plurality of directions for $k_i$. By selectively satisfying the momentum conservation condition, for a given $k$ direction by changing the acoustic frequency, the position of the scattered output beam can be controlled.

Figure 3:
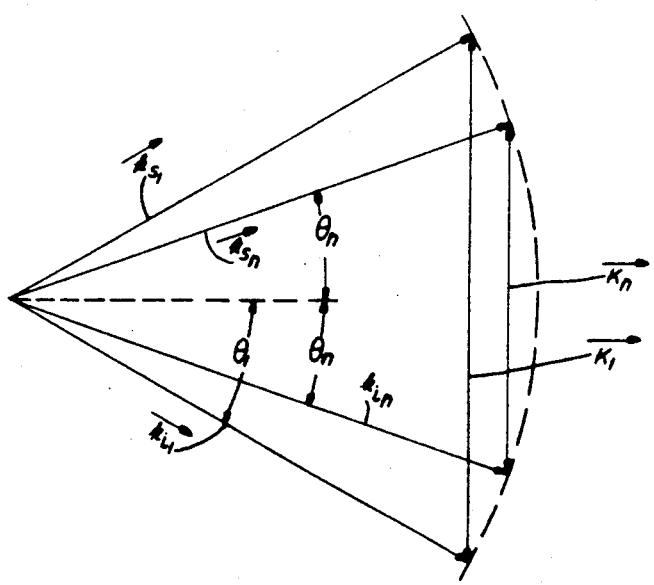
FIG. 3 is a graphical display of optical-acoustical scattering in accordance with the present invention.

The vector implications of scanning in accordance with the present invention can be seen from FIG. 3 in which incident optical ray $k_{i_1}$ at angle $\theta_1$ produces a scattered ray $k_{s_1}$ for an acoustic vector $K_1$. Optical rays incident at other angles produce no output energy since the magnitude of $K$ is incorrect to produce the proper closed vector triangle phase relationship. When, however, the acoustic frequency is changed, for example to $K_n$, the vector relationship for incident ray $k_{i_n}$ is satisfied and a separate output ray $k_{s_n}$ at angle $2\theta_n$ is produced. From FIG. 3, therefore, it can be seen that, for focused optical beam having a simultaneous plurality of incident ray directions, a plurality of scattered ray outputs can be produced by varying the acoustic frequency to satisfy the desired vector triangle requirements.

Figure 4:
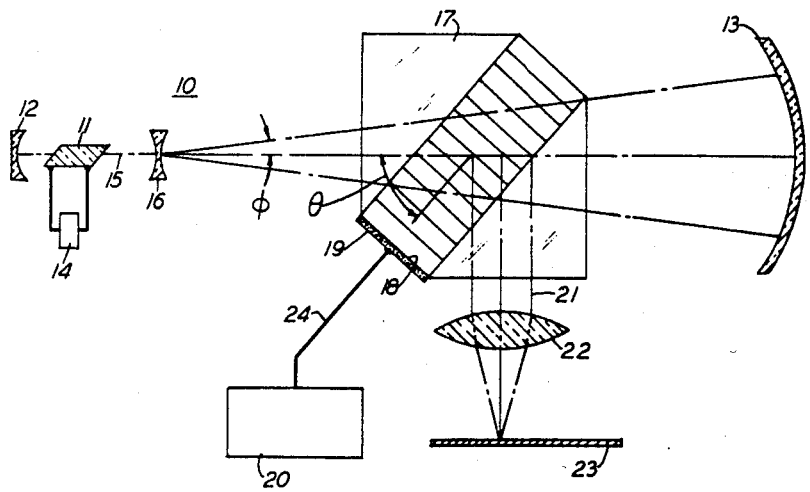
FIG. 4 is a semischematic view of line scanning in accordance with one embodiment of the present invention.

An illustrative embodiment incorporating the principles of the present invention is shown in FIG. 4, in which a line scanning information storage system 10 is schematically depicted. In FIG. 4 the source of optical waves is a laser medium 11 disposed within and on the axis 15 of a resonant cavity comprising spherical end reflectors 12, 13. Laser medium 11 is pumped by appropriate means indicated schematically as source 14. The output of laser 11 propagates along cavity axis 15 and is incident upon cylindrical lens 16 which imparts an angular spread over a half angle $\varphi$ to the propagating beam. In arrangements including at least one curved ellipsoidal cavity end mirror, some divergence of the laser beam is involved. However, the inclusion of a separate lens provides additional spread. The spreading optical beam propagates into a crystal 17 of electro-optic or photo-elastic material, such as potassium-tantalate-niobate (KTN), lithium niobate (LiNbO$_3$), or other appropriate mediums. Preferably, the broadest transverse dimension of the light beam within the center of crystal 17 is equal to many wavelengths of the acoustic wave which is also incident thereon.

Crystal 17 has at least one external surface 18 ground to effect Bragg angle incidence of the central ray of the laser beam upon the moving planes of maximum index of refraction within the crystal. Bonded to this surface 18 is a piezoelectric transducer 19 such as a thin film of cadmium sulfide or zinc oxide. Coupled to the transducer 19 is a source 20 of the input signal of variable frequency $\Omega$, for example an acoustic or microwave frequency signal. For electro-optically induced refractive index variations, the acoustic transducer would be replaced by a waveguide configuration such as a pair of parallel plates along the length of the electro-optic medium.

As a result of interaction between the optical and acoustic waves within crystal 17, as explained with reference to FIG. 3, a beam portion 21 is diffracted out of the crystal toward lens system 22 shown in FIG. 4 as a single lens but which can comprise a plurality of lenses. Lens system 22 focuses the output beam to a point on the output line scanning address means 23. The particular access point on the address means 23 is controlled by varying the frequency of source 20, and thence the magnitude of the acoustic vector K in crystal 17, necessary to close the vector triangle for the optical ray of interest. For the phase match condition the output beam generated by a single angularly disposed portion of the input beam appears at lens system 22 with an angle of incidence thereon producing a particular spot focus along address means 23.

Source 20 can take a number of forms. It can be, for example, a crystal controlled oscillator which can be individually switched into the input line; or a voltage tunable oscillator, the respective output of which is frequency-modulated with the separate components of address information, corresponding to the desired coordinate positions along line scanner 23. As is known, the microwave signal is typically applied to the transducer 19 through a coaxial cable 24, the center conductor of which is attached to the piezoelectric thin film 18 and the outer conductor of which is attached to a metallic film (not shown) that bonds the piezoelectric thin film to the crystal 17 and forms an interface with said crystal. A variety of other methods of applying the signal to the thin film are also possible. When the medium is KTN, for example, another means for injecting microwave energy is that described in an article by M. G. Cohen and E. I. Gordon, entitled "Electro-Optic Gratings for Light Beam Modulation and Deflection," which appeared in Applied Physics Letters, volume 5, pages 181–182, Nov. 1, 1964.

The basic principles of operation that are pertinent to the described embodiment of the present invention may be summarized as follows.

The properties of the scanner are such that, for light polarized properly relative to the direction of propagation of the microwave-excited acoustic wave, the acoustic wave induces a variation in the optical index of refraction of the crystal 17. This traveling variation in the index of refraction can be considered to be a moving diffraction grating; and, at high microwave frequencies with optical beam width adapted substantially to exceed the acoustic wavelength, virtually all of the light that is deflected falls into the first grating order.

The interaction is basically a parametric one involving the incident and deflected light beams and the acoustic wave. The proper choice of the angle $\theta$ between the directions of the acoustic wave and the incident light beam allows phase-matching, so that a large amount of optical energy is deflected (as well as frequency-shifted). The deflection of the emergent optical beam varies directly as the acoustic frequency (assuming constant acoustic velocity as a function of frequency), and, the range of deflection angles is proportional to the effective frequency range of the acoustic waves.

It can be shown that the total number of resolvable spots to which the beam may be focused is approximately $$N = \frac{2\varphi d}{\lambda}$$

where $2\varphi$ is the total incident optical beam spread and $d$ is the length of the scattering interaction path projected on a normal to the scattered energy.

It should be noted that, as the light beam propagates through the system of FIG. 4, the actual amount of deflected energy at the exit face of crystal 17 is quite small in relation to the energy in the main beam. This is one reason for placing the interaction within an optical cavity. In addition, while only a portion of the optical beam is used for a given output spot, all the acoustic energy is involved. For laser environments, this somewhat inefficient use of the optical beam is not restricting since the portion of the optical beam not extracted by Bragg deflection remains within the laser cavity.

Acoustic light modulation systems may also be provided with increased bandwidth by employing the focusing principles of the present invention.

In FIG. 4, the light intensity at a particular address along means 23 can be controlled by variation of the intensity of the acoustic beam in crystal 17. Thus by a combination of variations in the frequency and amplitude of the acoustic source 20, a one-dimensional display containing a plurality of light intensities along address means 23 can be provided.

Numerous other applications of the principles of the present invention may occur to workers in the art without departing from the spirit and scope thereof.

It should be particularly noted that the lens 16 in the embodiment of FIG. 4 can produce either a convex, divergent, light beam wavefront as shown or it can be replaced by a converging lens system to produce a concave, convergent, light beam wavefront. The effect is the same in either case since the variety of angles for $k_1$ is provided by both arrangements.

It should be further noted that the principles of the invention can be embodied in an arrangement which does not involve placing the Bragg deflection element within an optical cavity. In such cases, the optical beam executes only a single pass through the deflection element. Among the advantages of this particular configuration are increased optical or modulation bandwidth and reduced sensitivity to angular alignment.

What is claimed is:

1. A light beam deflecting arrangement of the type in which an optical beam in a light-transmissive material interacts with an acoustic beam comprising an element of said material in the path of the optical beam, and means for providing within said material an acoustic beam; characterized in that focusing means are provided for producing within said material converging or diverging optical beam wavefronts that are incident on and interact with the acoustic beam.

2. The arrangement according to claim 1 in which said focusing means is a lens.

3. The arrangement according to claim 1 in which said focusing means is a mirror.

4. The arrangement according to claim 1 in which said material is acousto-optic.

5. The arrangement according to claim 1 in which said material is electro-optic.

6. The arrangement according to claim 1 in which said material is disposed within an optical cavity containing an active laser element.

7. The arrangement according to claim 6 in which said focusing means produce a divergent optical beam.

8. The arrangement according to claim 6 in which said focusing means produce a convergent optical beam.

References Cited

UNITED STATES PATENTS 3,286,193   11/1966   Koester et al. _____ 331—94.5

OTHER REFERENCES

IEEE Journal of Quantum Electronics, April 1965, pp. 60–61, "An Ultrasonic Light Deflection System" by Korpel et al.

Applied Physics Letters, vol. 5, No. 9, Nov. 1, 1964. "Electro-Optic (KTN) Gratings for Light Beam Modulation and Deflection" by Cohen et al.

RONALD L. WIBERT, Primary Examiner

PAUL K. GODWIN, Jr., Assistant Examiner

U.S. Cl. X.R.

331—94.5